United States Patent
Hubach et al.

(10) Patent No.: US 8,799,963 B2
(45) Date of Patent: Aug. 5, 2014

(54) RECEIVER UNIT CHANGING BETWEEN A HIGH DEFINITION MODE AND STANDARD MODE AND METHOD THEREFOR

(75) Inventors: Ronald J. Hubach, Corona, CA (US); Ivonne Y. Chen, Torrance, CA (US); Natalya Klimochkin, Los Angeles, CA (US); Sewon Oh, Los Angeles, CA (US); Tam T. Leminh, Cypress, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 888 days.

(21) Appl. No.: 12/112,604

(22) Filed: Apr. 30, 2008

(65) Prior Publication Data
US 2009/0276810 A1 Nov. 5, 2009

(51) Int. Cl.
*H04N 7/20* (2006.01)

(52) U.S. Cl.
USPC .......... 725/68; 725/39; 725/40; 348/555; 348/556

(58) Field of Classification Search
USPC .......... 725/68, 39, 40, 48; 348/555, 556
See application file for complete search history.

(56) References Cited

U.S. PATENT DOCUMENTS

| | | | | |
|---|---|---|---|---|
| 5,461,427 A | * | 10/1995 | Duffield et al. | 348/555 |
| 5,583,562 A | * | 12/1996 | Birch et al. | 725/151 |
| 6,157,377 A | * | 12/2000 | Shah-Nazaroff et al. | 715/719 |
| 6,182,287 B1 | | 1/2001 | Schneidewend et al. | |
| 7,225,458 B2 | | 5/2007 | Klauss et al. | |
| 2004/0102154 A1 | * | 5/2004 | Klauss et al. | 455/3.01 |
| 2004/0111742 A1 | * | 6/2004 | Hendricks et al. | 725/34 |
| 2006/0184992 A1 | * | 8/2006 | Kortum et al. | 725/135 |
| 2008/0080843 A1 | * | 4/2008 | Hibbard et al. | 386/123 |
| 2008/0141317 A1 | * | 6/2008 | Radloff et al. | 725/87 |
| 2008/0144955 A1 | * | 6/2008 | Rai | 382/254 |
| 2008/0301749 A1 | * | 12/2008 | Harrar et al. | 725/131 |
| 2009/0031335 A1 | | 1/2009 | Hendricks et al. | |
| 2011/0072461 A1 | * | 3/2011 | Moon et al. | 725/40 |

FOREIGN PATENT DOCUMENTS

WO    WO 2008095566 A1   *   8/2008

OTHER PUBLICATIONS

Final Rejection dated Mar. 2, 2011 in U.S. Appl. No. 12/112,524, filed Apr. 30, 2008 by Ronald J. Hubach et al.
Non-final Office action dated Sep. 28, 2010 in U.S. Appl. No. 12/112,524, filed Apr. 30, 2008 by Ronald J. Hubach et al.
Non-final Office action dated Apr. 17, 2012 in U.S. Appl. No. 12/112,524, filed Apr. 30, 2008 by Ronald J. Hubach et al.
Final Rejection dated Nov. 13, 2012 in U.S. Appl. No. 12/112,524, filed Apr. 30, 2008 by Ronald J. Hubach et al.

* cited by examiner

*Primary Examiner* — Brian T Pendleton
*Assistant Examiner* — Alan Luong

(57) ABSTRACT

A system and method of switching services in a receiver unit includes a verifier module in the receiver unit receiving a service signal and middleware within the receiving unit receiving an evaluate signal and enabling the verifier to determine a service change from the service signal. The middleware changing a service flag for the service when a service change is determined at the verifier.

23 Claims, 12 Drawing Sheets

RECEIVER UNIT CHANGING BETWEEN A HIGH DEFINITION MODE AND STANDARD MODE AND METHOD THEREFOR

TECHNICAL FIELD

The present disclosure relates generally to a receiving device and, more specifically, to a method and system for switching a receiving device between a high definition mode and a standard definition mode based upon inputs such as subscription information.

BACKGROUND

The statements in this section merely provide background information related to the present disclosure and may not constitute prior art.

Satellite television has become increasingly popular due to the wide variety of choices available on a national level. Satellite television systems use a set top box or other type of satellite receiver unit for receiving and displaying satellite broadcasted material. DIRECTV® has become noted for their abundance of high definition television. To receive high definition television, a receiver box capable of tuning and decoding the high definition channels is required. Standard definition channels are also available and require a standard definition receiver unit. If a subscriber only has standard definition, then a standard definition receiver unit is all that is required.

However, as consumers change televisions to high definition models, a switch to high definition programming is eminent so that the consumer can take full advantage of the resolution of their television. However, providing a new box for each customer is inconvenient and expensive.

SUMMARY

The present disclosure provides a method for operating a set top box between high definition mode and standard definition mode based on inputs received from a central source. The present disclosure includes a set top box that is capable of providing both standard definition and high definition modes.

In one aspect of the disclosure, a method of operating a receiving unit includes receiving a service signal, receiving an evaluate signal, in response to receiving the evaluate signal, determining whether the service signal indicates a service change and when the service signal indicates a service change, setting a service flag.

In another aspect of the invention, a method of operating a receiving unit includes receiving high definition signals at a receiving unit, determining whether a flag setting corresponds to a high definition standard definition flag setting or a standard definition flag setting, when the flag setting corresponds to standard definition, reducing a resolution of the high definition signals to a standard definition resolution and displaying the standard resolution signal.

In a further aspect of the disclosure, a system includes a receiving unit that includes a verifier module receiving a service signal and middleware receiving an evaluate signal and enabling the verifier to determine a service change from the service signal. The middleware changing a service flag for the service when a service change is determined at the verifier.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 9A corresponds to standard definition and FIG. 9B corresponds to high definition.

DETAILED DESCRIPTION

Figure 1:
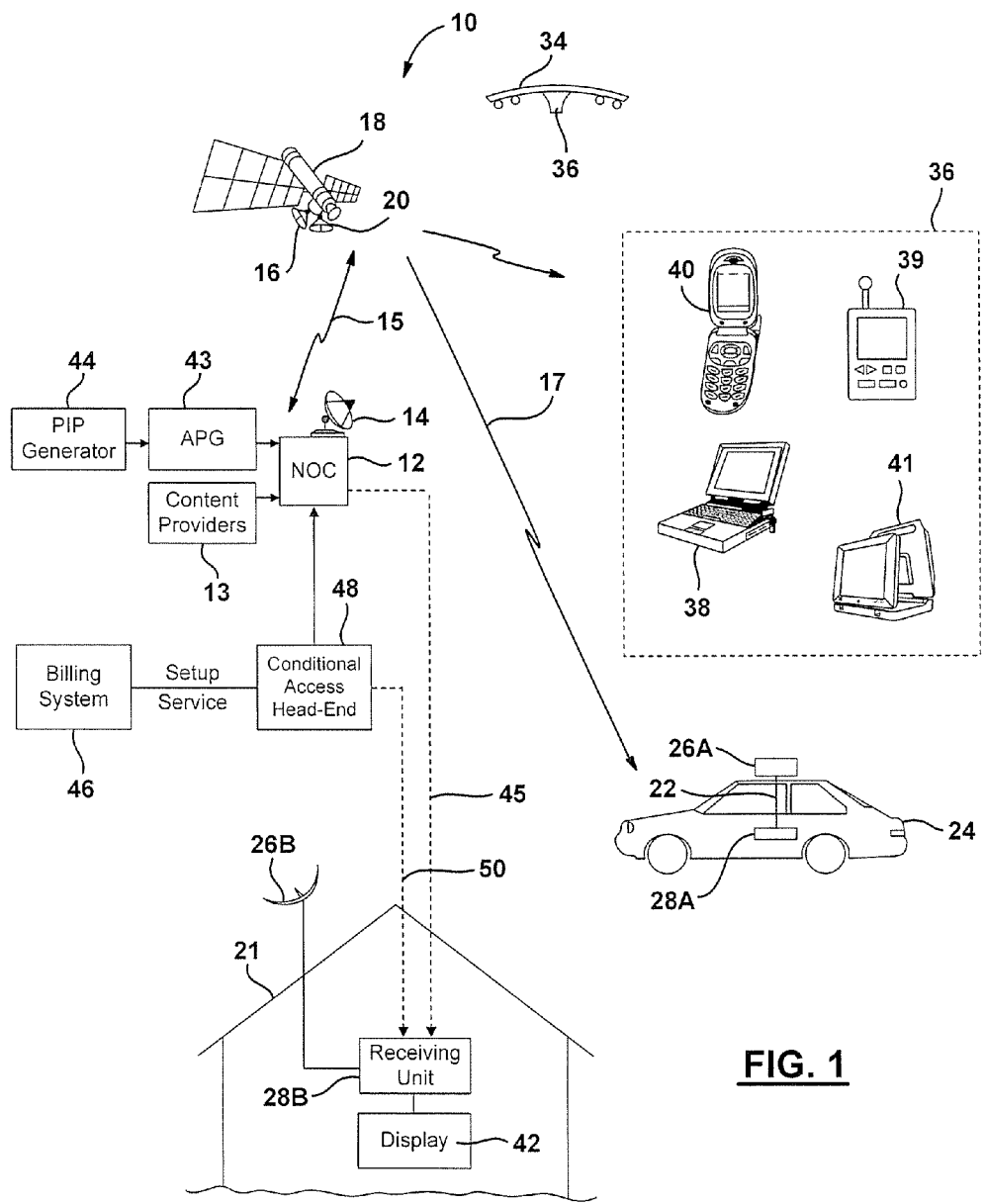
FIG. 1 is a block diagrammatic system view of a communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcasting system 10 is set forth in the following example. The satellite television broadcasting system 10 includes a network operations center (NOC) 12 in communication with various content providers 13. The NOC 12 may also be referred to as a head end. Various programming content may be provided from the content providers 13 including movies, sporting events and the like. The content providers 13 may provide live feeds as well as recorded material. The content providers may thus provide signals or media. The content may be in high definition or standard definition or both.

The network operations center 12 generates wireless communication signals 15 through a transmitting antenna 14 which are received by a receiving antenna 16 of a high altitude device such as a spaced-based satellite 18. The wireless communication signals, for example, may be digital, digital video, data or digital audio. As will be described below, the wireless communication signals may be entertainment content, live content, traffic, weather, hazardous material warning areas or advertising marketing. The wireless signals 15 may be referred to as uplink signals.

Wireless communication signals 17 such as downlink signals may be generated from the satellite 18. The downlink signal corresponds in content to the uplink signals.

A transmitting antenna 20 of the satellite 18 communicates the downlink signals 17 to various receiving systems including stationary systems such as those in a home 21 as well as mobile receiving systems 22. The wireless signals may also have various video and audio information associated therewith. The home 21 represents a building that may be a single family dwelling or multi-dwelling unit. The home 21 may also represent commercial building such as a hotel.

The mobile receiving system 22 is disposed within an automotive vehicle 24. Several mobile systems 22 may be incorporated into a network. The mobile receiving system 22 includes a receiving antenna 26A that receives the wireless signals 17 from the satellite 18 and processes the signals in a receiving unit 28A. The mobile receiving unit 28 will be further described below. The receiving unit 28 may include an over-the-air receiving unit 30 in communication with an over-the-air antenna 32.

The satellites 18 may also be replaced with another high altitude device such as a stratospheric platform 34 for transmitting content to the mobile device, transmitting communication signals, transmitting lost content segments and transmitting location-specific signals. Stratospheric platforms 34 are manned or unmanned airplanes, airships, or the like that fly above commercial airspace. It is envisioned that stratospheric platforms may fly at altitudes between 60,000 and 100,000 feet from the surface of the earth. Thus, the stratospheric platforms are in a significantly lower position than even low earth orbit satellites.

The stratospheric platforms 34 may also include a transponding unit 36 that is used to receive and retransmit signals from the satellite 18. The transponding unit 36 may be referred to as a stationary unit since the stratospheric platform maintains a particular position above the earth. The receiving unit 36 may be used to transfer content segments or packets to another node of the device.

The present invention may also be used for displaying and communicating various wireless communication signals on a personal mobile receiving unit 36 such as a laptop computer 38, a personal digital assistant 39, a cellular telephone 40 and the portable satellite receiver 41 such as the SAT-GO® system provided by DIRECTV®.

The home 21 may include a user receiving unit 28B that communicates with the satellite through the antenna 26B. The receiving unit 28B may also be in communication with a display 42 such as a television.

An advanced program guide (APG) system 43 may provide content guide information to the network operation center 12. The program guide system 43 organizes data available regarding the programming channels and organizes them for ultimate transmission to the receiving devices including 28A-B and 36. The receiving devices may receive the program grid guide data and display a grid guide in response thereto. The program guide data may be referred to as program objects. The program objects may also include identifiers for the type of program (movie, sports, series), a series or short identifier and an episode number for a series. As will be further described below, a content identifier, a Tribune Media Services® ID, a program information packet or another identifier may be used as an identifier for a particular program. These may be found in the data corresponding to the program guide system 43. The same or equivalent program or event may have the same or similar packet identifier, program-associated data, Tribune Media Services® ID or content identifier.

One of the objects the advance program guide system may generate is a vendor object. The vendor object (VO) or a portion thereof may act as an evaluate signal when received by a receiving unit 28. The vendor object may include various information including a vendor identifier and a content identifier. The vendor identifier may correspond to a producer or vendor of a particular type of receiving unit. For example, a vendor ID may correspond to all receiving units made by DIRECTV® or a particular type of receiving unit produced by DIRECTV®. Other vendors may have another ID that corresponds to another model. The content ID may provide a content identifier such as a high definition upgrade check. A purchase information packet (PIP) may be generated by a PIP generator 44 and communicated to the advance program guide 43. The PIP generator may be used to generate various portions of the vendor object, such as the vendor ID and/or the content ID. The advance program guide 43 communicates the program guide signals that correspond to the grid guide as well as the vendor objects to the network operation center 12 where they are communicated over the satellite. As is illustrated by dotted line 45, a wired or wireless communication system or network may also be used for communicating the program guide and/or the vendor objects to the receiving unit 28. It should be noted that the PIP generator 44, APG 43, and NOC 12 may all be physically located in the network operations center 12 or other central location. The NOC 12 may also be referred to as a head end.

A billing system 46 may be used to generate a set-up service signal or service signal. The billing system 46 may include customer operators or receive feedback through a voice-automated system, or the like which provides an indication that a customer would like to upgrade or downgrade their system from a standard definition signal to a high definition signal or from a high definition signal back to a standard definition signal. The service signal is communicated to the STMS 48 (Secure Transaction Management System). The STMS 48 may be used to communicate the service signal to the network operation center 12 and ultimately to the receiving unit through the satellite. As illustrated by dotted line 50, the STMS 48 may communicate the service signal through a wired or wireless connection directly to the receiving unit through a network such as the Internet or the public switch telephone network.

Figure 2:
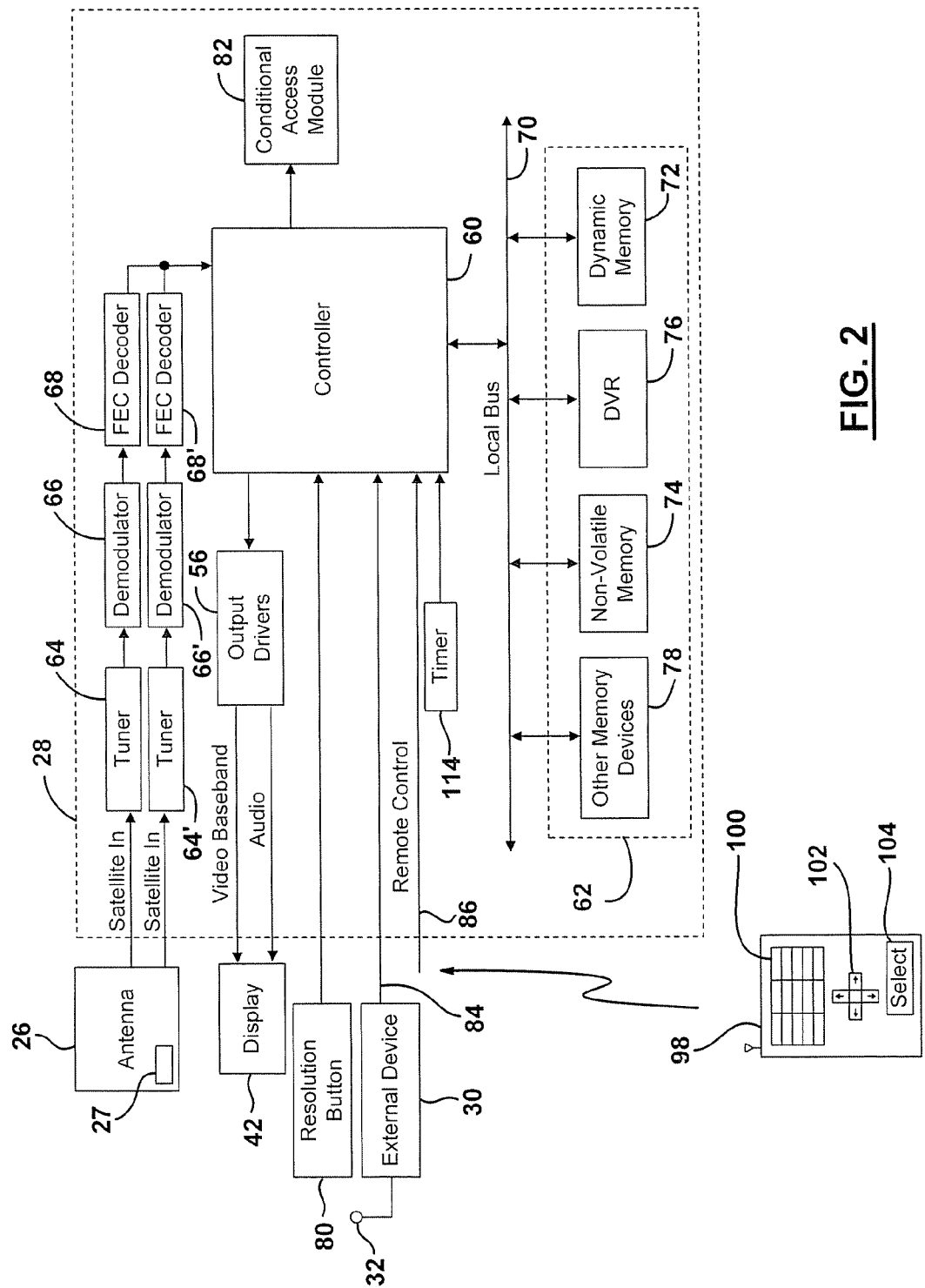
FIG. 2 is a detailed block diagrammatic view of a receiving unit of FIG. 1.

Referring now to FIG. 2, the mobile stationary receiving units described above are collectively referred to as receiving unit 28 which is illustrated in further detail. The receiving units 28 may also be generally configured in a similar manner. The receiving units 28 may also be referred to as receiving devices or user devices. Antenna 26 may be various types of antennas including a rotating antenna which is used to track the relative movement of the satellite or other transponding device with respect to a vehicle. The antenna 26 may be a single fixed antenna used for satellite television reception for a building or home 21. The antenna 26 may also be an electronic antenna. The antenna 26 may include an internal controller 27 that controls the operation of the antenna 26, which is suitable for a moving or rotatable antenna. The antenna 30 used for receiving over-the air signals may be physical combined with antenna 26.

The receiving unit 28 may include or be associated with the display 42 associated therewith. The display 42 may be incorporated into the unit 28 or may be external to the receiving unit such as part of a vehicle 24 or television. The display 42 may have output drivers 56 used for generating the desired audio and video outputs suitable for the particular display 42.

A controller 60 may be a general processor such as a microprocessor. The controller 60 may be used to coordinate and control the various functions of the receiving unit 28. Some modules within the controller are described above. These functions may include controlling a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DIRECTV® set top boxes which employ a chip-based multifunctional controller.

It should be noted that more than one tuner 64, demodulator 66 and forward error correction decoder 68 may be provided in the system. In this example, a second tuner 64', a second demodulator 66' and a second forward error correction decoder 68' may be provided in the receiving unit 28. Of course, various numbers of tuners may be incorporated into a receiving unit 28.

The controller 60 may include or be coupled to a local bus 70. The local bus 70 may be used to couple a memory including dynamic memory 72 such as RAM which changes often and whose contents may be lost upon the interruption of power or boot up. The bus 70 may also be coupled to a non-volatile memory 74. The non-volatile memory 74 may be an in-circuit programmable type memory. One example of a non-volatile memory is an EEPROM. One specific type of EEPROM is flash memory. Flash memory is suitable since it is sectored into blocks of data segments that may be individually erased and rewritten. The non-volatile memory may include a bit or bits that act as a service identifier. A standard definition, high definition resolution or service flag may be included in the non-volatile memory as will be described below. The flag could be a simple bit that indicates standard definition in one state and high definition in the other state.

A digital video recorder (DVR) 76 may also be coupled to the local bus 70. The digital video recorder 76 may be within the receiving device 28 or coupled to the receiving device. The digital video recorder 76 may be used to store programming content or sub-contents.

Other memory devices 78 may also be coupled to local bus 70. The other memory devices may include other types of dynamic memory or non-volatile memory. The display 54 may be changed under the control of controller 60 in response to the data in the dynamic memory 72 or non-volatile memory 74. Part of the memory 62 may be used as a buffer.

The controller 60 may also be coupled to a user interface. User interface may include a resolution button 80. The resolution button 80 may be part of various types of user interfaces such as a keyboard, a stand alone button or a touch screen. The resolution button 80 may be used to select an upgrade or downgrade in resolution. The resolution button 80 is illustrated as part of the receiving unit 28. However, should the unit 28 be incorporated into a vehicle, the user interface 80 may be located external to the mobile receiving unit such as dial buttons, voice activated system, or the like incorporated into the vehicle and interface with the receiving unit. If only standard definition is subscribed to, up-converting may be described.

A conditional access module 82 (CAM) may also be incorporated into the receiving unit. The access module 82 may include software to allow the receiving unit 28 access to various channels and wireless signals generated by the system. Not having an access card or not having an up-to-date access card 82 may prevent the user from receiving or displaying various wireless content from the system.

One specific type of user interface is a remote control device 98 having a key pad 100, an arrow key pad 102, and a select button 104 may also be provided. Inputs to the receiver 28 may be provided by the remote control device 98 or through another type of user interface 80.

Figure 3:
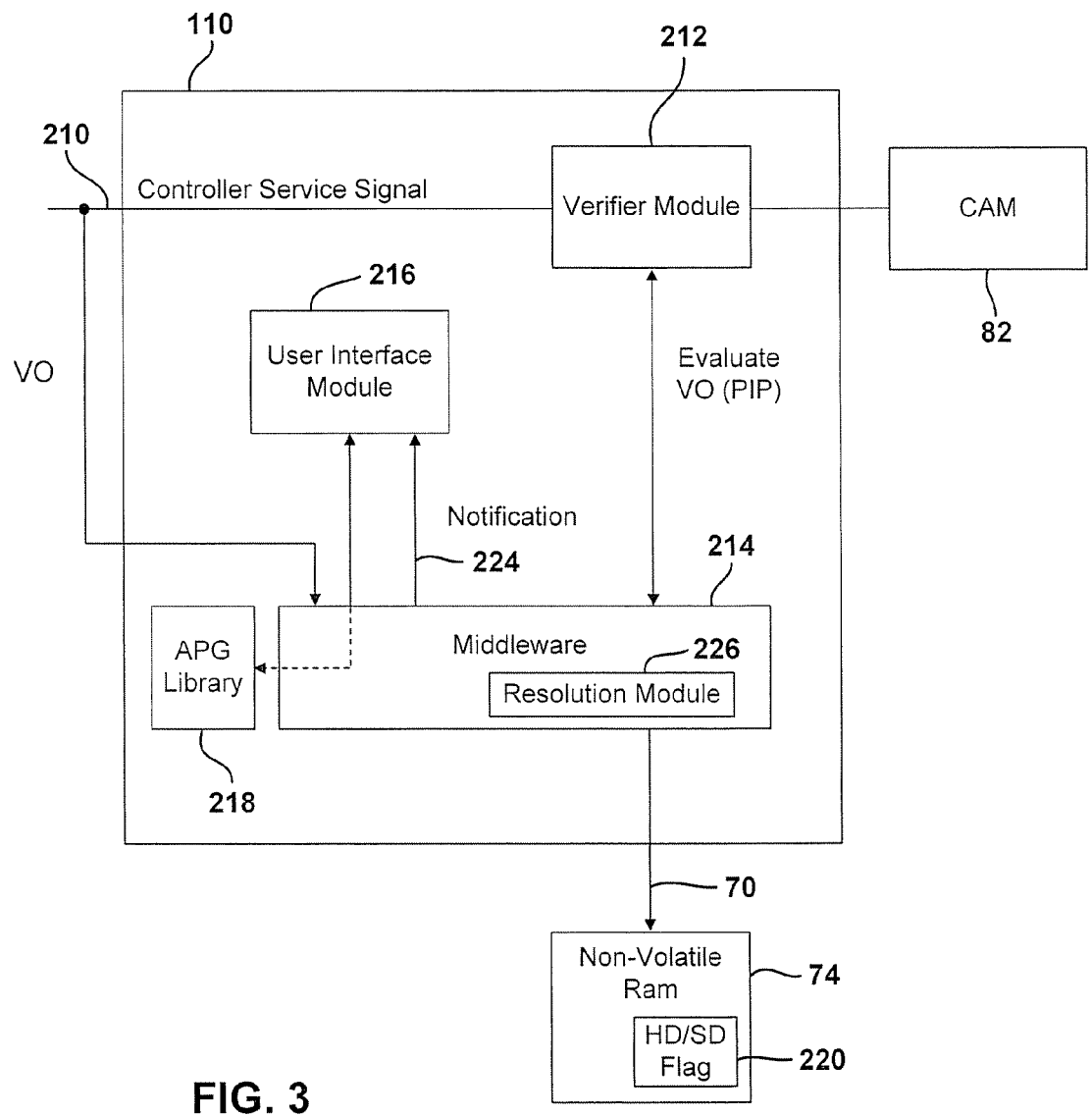
FIG. 3 is a detailed block diagrammatic view of the controller of FIG. 1

Referring now to FIG. 3, the controller 110 of FIG. 2 is illustrated in further detail. It should be noted that the controller 110 is microprocessor-based and may include more than one microprocessor. Also, the module set forth within the controller 110 may be implemented in hardware, software or combinations of hardware and software. The signals from the satellite are received at a controller input 210. As mentioned above, some signals may be received through the satellite or through another means. Input 210 is meant to represent any means through which signals ultimately end up at the controller. One signal the controller 110 receives is a service signal. The service signal is communicated to a verifier module 212. The verifier module 212 ultimately communicates with the conditional access module 82 and the middleware within the controller 214. The controller 110 also includes a user interface module 216 also in communication with middleware 214. The middleware 214 also is in communication with an advance program guide library 218 and a service flag 220 that is disposed within the nonvolatile memory 74. The flag 220 may also be referred to as a resolution flag 220 in this example of high definition/standard definition service. The flag 220 may be used to indicate another service different from resolution should the system be used to initiate another service.

The service signal 210 may include an identifier specific to the particular user or the receiving unit. For example, a conditional access card module identifier or a receiver identifier may be encoded into the service signal.

The controller 110 may also receive an evaluate signal through the controller input 210. It should be noted that the evaluate signal may not originate through the same input as the service signal. For example, the evaluate signal may be received through a wired or wireless terrestrial connection while the service signal may be communicated through the satellite, or vice versa.

The evaluate signal may be communicated to the controller 110 ultimately from the advance program guide module 43 through the network operation center 12 (of FIG. 1). The evaluate signal may be communicated through a vendor object that includes a vendor identifier and a content identifier. The vendor identifier may correspond to a particular type of box or boxes as mentioned above. The content identifier may correspond to an HD upgrade or a standard definition downgrade. Of course, such signals may be digitally encoded signals. The evaluate signal is communicated to the middleware 214 of the controller 110. Upon receiving the evaluate signal, the middleware 214 extracts a purchase identifier packet that essentially commands the middleware 214 to query the verifier module 212 to determine whether the service has been changed. The verifier module 212 will then check the latest service signal and determine whether or not the service has been changed based upon the resolution flag 220. If the flag 220 is in standard definition mode and the service signal indicates that high definition service has now been authorized, the middleware 214 changes the resolution flag to indicate high definition service has been enabled.

By providing the resolution or service flag 220, high definition content is enabled.

The middleware 214 provides a notification signal 224 to the user interface module 216 that a change has been made to the standard definition and high definition service. In this case, the high definition service has been enabled. The user interface module 216 then controls the content within the advance program guide library 218. The advance program guide library 218 may include both standard definition and high definition content but the user interface module 216 does not allow the high definition content to be displayed through the receiving unit until the high definition flag has been enabled. Various high definition icons and content stored within the digital video recorder may also be enabled in high definition.

The middleware 214 may include a resolution module 226 that controls the display in high definition or standard definition. The resolution module 226 may interact with the output drivers 56 of FIG. 2. When the resolution flag 220 has been set to indicate standard definition, the resolution output from the receiver unit may only be in standard definition. However, should the high definition standard definition flag 220 be set to indicate high definition content, the high definition content will be output from the receiving unit.

Figure 4:
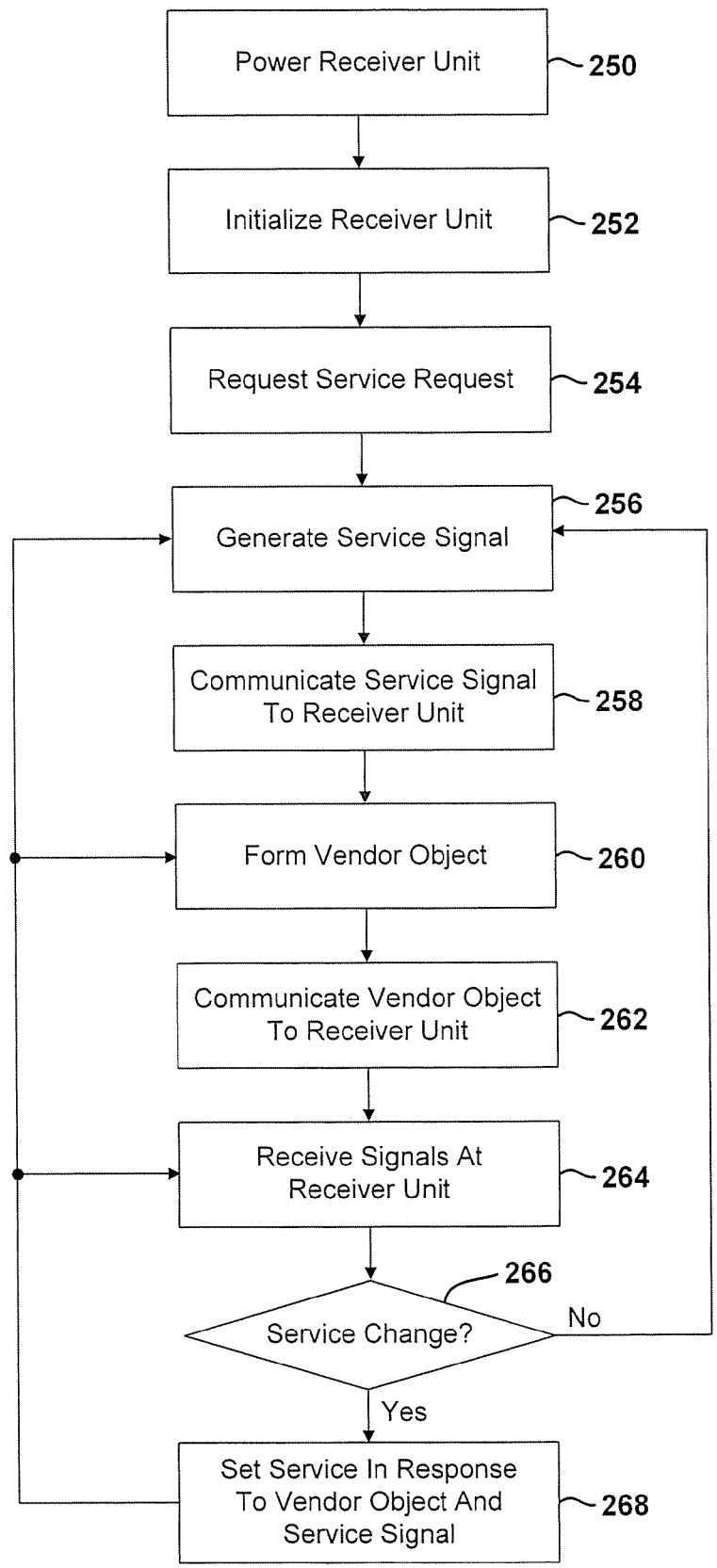
FIG. 4 is a flowchart of a method for changing a receiver unit to a different resolution.

Referring now to FIG. 4, the general operation of this system at the network operation center side is generally described. In step 250, the receiver unit is powered and in step 252, the receiving unit is initialized. The initialization may take place using standard techniques to activate a DIRECTV® set top box including a callback. In step 254, a service request is received from a customer (or a technician initializing the box). The service request may provide an initial request for standard definition service or high definition service or provide a change in service from standard definition to high definition or vice versa. The system may also be used for enabling various audio and video services. The service request may also come from the NOC or other centralized source. For example, the provider company may offer a free preview day or weekend so that various customers may sample the particular service.

In step 256, a service signal is generated. As mentioned above, the service signal may be generated through the billing system 46 of FIG. 1. Also, the secure transaction management system 48 may also be used to communicate the service request to the network operation center for ultimate uplink through the satellite 18 illustrated in FIG. 1.

In step 258, the service signal is communicated to the receiver unit. As mentioned above, the service signal may be communicated through the satellite 18 or other wireless or wired means.

In step 260, a vendor object is formed at the advance program guide 43 of FIG. 1. The vendor object may include various data including a content identifier and a vendor identifier as mentioned above. A purchase information packet may also be included within the vendor object. The vendor object will thus be referred to as an enable signal to initiate checking the service status. In step 262, the vendor object is communicated to the receiver unit. As mentioned above, the vendor object may be communicated in the same method as the service signal or through a different method. The vendor object may be communicated through the satellite 18 or through a terrestrial wireless or wired link. In step 264, both the service signal and vendor object are received at the receiver unit. In step 266 a determination of whether the service has changed is performed by the receiver unit. In step 268, the service is set in response to the vendor object and the service signal within the receiver unit. After step 268, step 256, 260 or 264, or all three, may again be performed.

Figure 5:
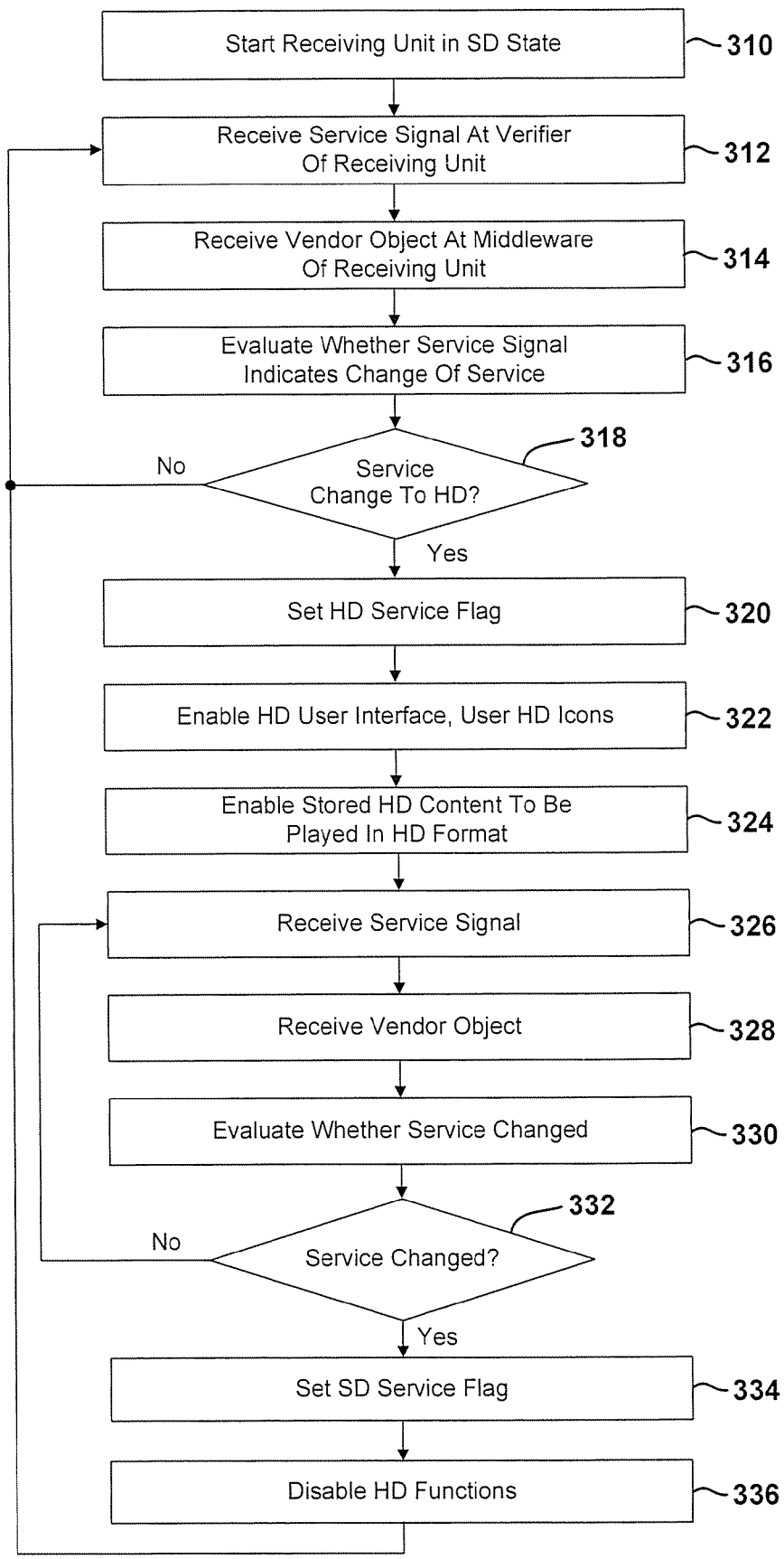
FIG. 5 is a flowchart of a method for changing the receiver unit to another resolution.

Referring now to FIG. 5, operation of the receiver unit or set top box is illustrated. In step 310, the receiver unit is presumed to be in a standard definition state. In step 312, a service signal is received at the receiver unit. In particular, the service signal may be received at the verifier 212 illustrated in FIG. 3.

After step 312, step 314 receives a vendor object at the middleware 214 illustrated in FIG. 3. In step 316, the middleware may initiate the verifier module 212 to determine whether the service signal indicates a change of service. In step 318, if a change of service has not been indicated, the receiver unit again performs steps 312-316.

In step 318, if a change from standard definition to high definition is indicated by the service signal, the flag 220 is set to indicate high definition service in step 320. As mentioned above, the resolution flag may be set within the non-volatile RAM 74 and particularly the resolution flag 220 illustrated in FIG. 3.

Step 322 enables the high definition user interface to be provided to the display 42. This is in contrast to the standard definition user interface with hidden content. Likewise, high definition icons may also be enabled. In step 326, a service signal is again received. In step 328, a vendor object is again received. In step 330, the vendor object initiates the receiver unit to determine whether the service signal indicates a service change. In step 332, if service has been changed back to standard definition, step 334 sets the resolution flag to indicate standard definition service. In step 336, the high definition functions are disabled. That is, the user interface is provided with only standard definition content and high definition icons are disabled. Also, content stored within the digital video recorder may be provided from the receiver unit or DVR in standard definition. Channels received in high definition may also be provided from the receiver unit in a lower resolution.

After step 336, step 312 may be performed so that the process is repealed.

Figure 6:
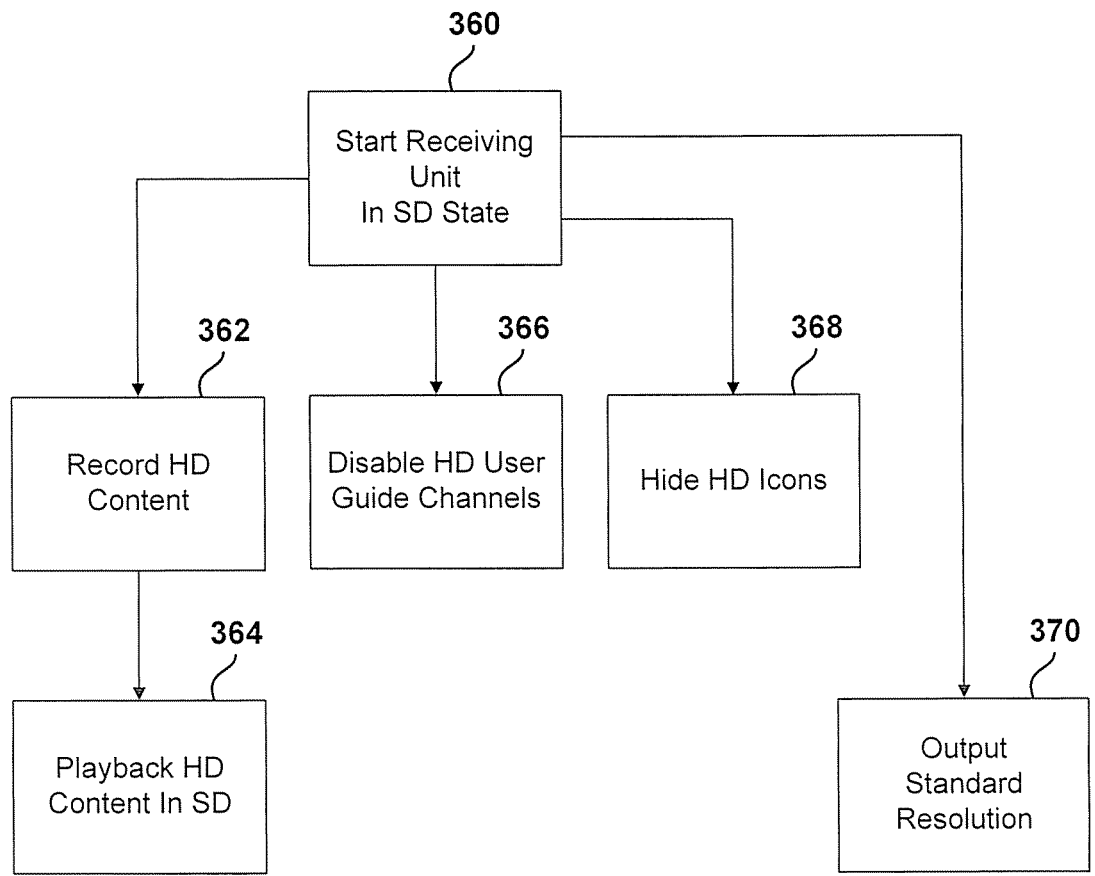
FIG. 6 is a flowchart of a method for options corresponding to the standard definition state.

Referring now to FIG. 6, a method of operating the receiving unit in standard definition state is illustrated. The receiving unit starts in standard definition state in step 360. In step 362, if the content is native high definition, high definition content is recorded within the DVR. However, in the standard definition state, the playback or output resolution is provided in standard definition only. Thus, the resolution is changed or downgraded before being provided to the display.

Referring back to step 360, the standard definition state also disables the high definition user guide channels in step 366. That is, the high definition channels may be hidden from view even though they are stored in the APG library.

Referring back to step 360, in the standard definition state, high definition icons are also hidden from view in step 368. The icons, even though they are stored in the APG library, may be hidden from view.

In block 370, the video signal output from the box is output in standard definition. Should the content be native high definition, the content is down-resolutioned to standard definition. Native standard definition signals may not need further processing.

Figure 7:
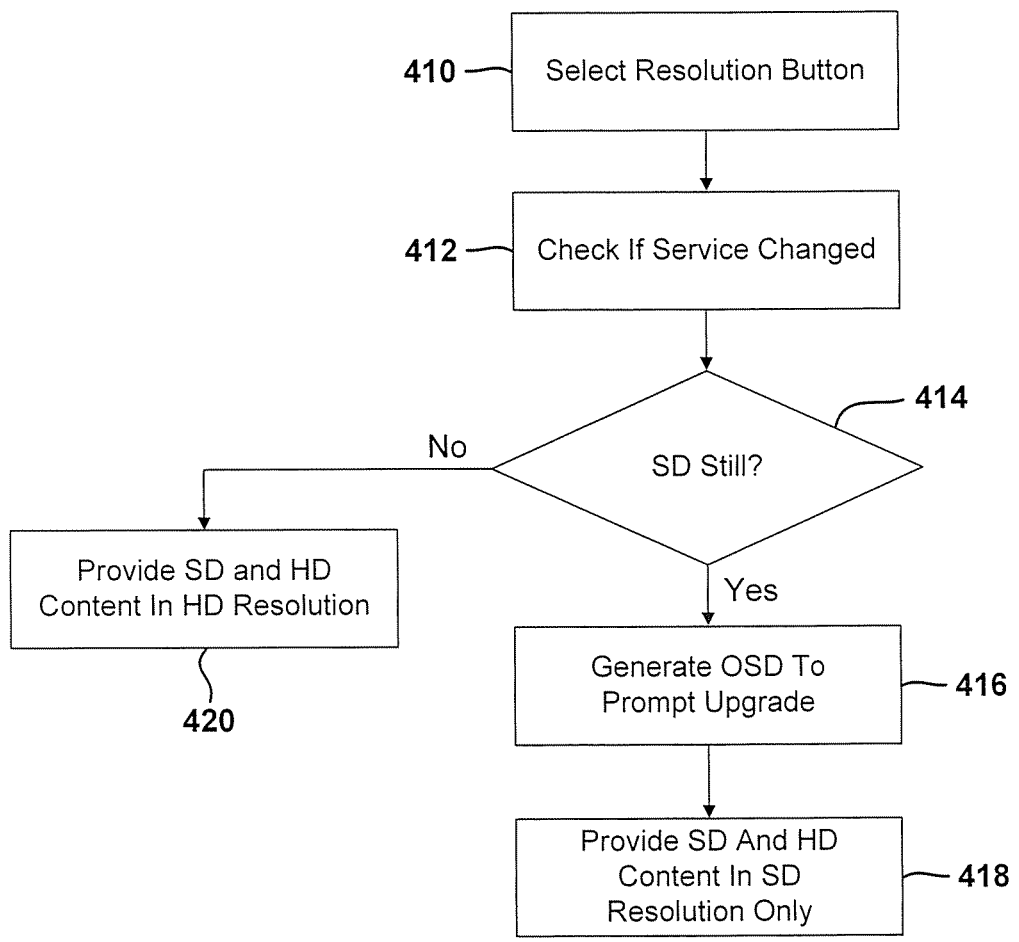
FIG. 7 is a method for operating a resolution button of the receiver unit.

Referring now to FIG. 7, the receiver unit may also include a resolution button. The resolution button 80 (of FIG. 2) may be selected in step 410. The resolution button 80 may also check to determine if service has been changed. By initiating a check for a newly-received service center. In step 414, if the service signal does not indicate a change, meaning the standard definition is still enabled, step 416 may generate an on-screen display (OSD) to prompt the user to obtain an upgrade. In step 418, since standard definition is still enabled, native SD and HD content are provided only in SD resolution.

Referring back to step 414, if standard definition is not still enabled, meaning that high definition has been enabled, step 420 enables the content in high definition as set forth in step 320 through step 324 of FIG. 5.

Figure 8A:
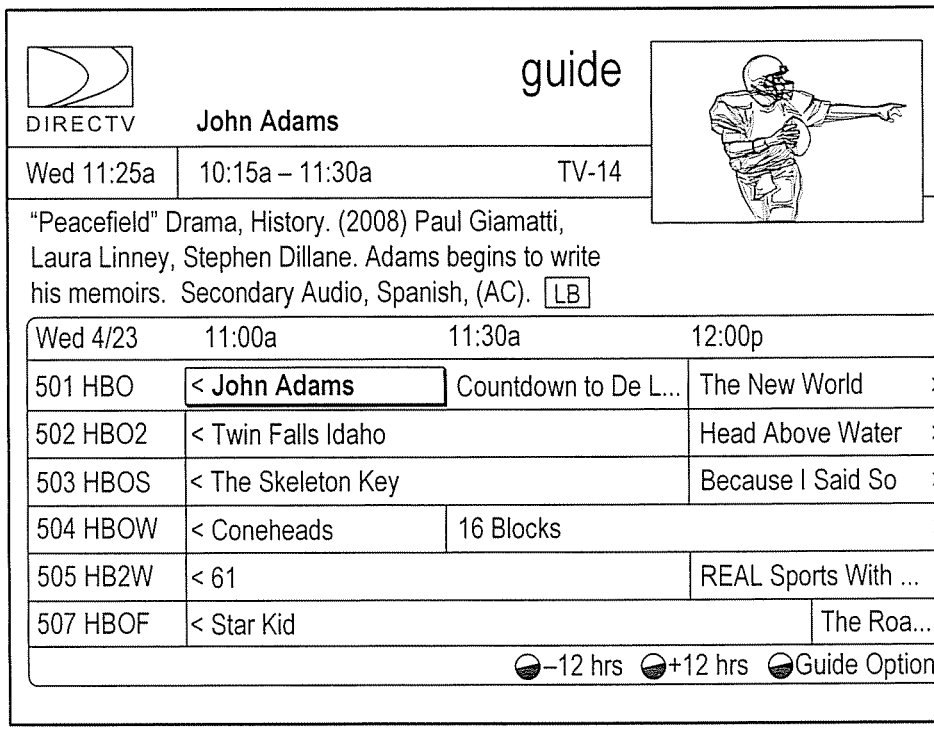
FIGS. 8A and 8B are on-screen displays of a grid guide contrasting the difference between standard definition in FIG. 8A and high definition in FIG. 8B.

Referring now to FIG. 8A, an on-screen display 510 is illustrated. The on-screen display 510 includes a grid guide 512 that includes displays of standard definition content.

Figure 8B:
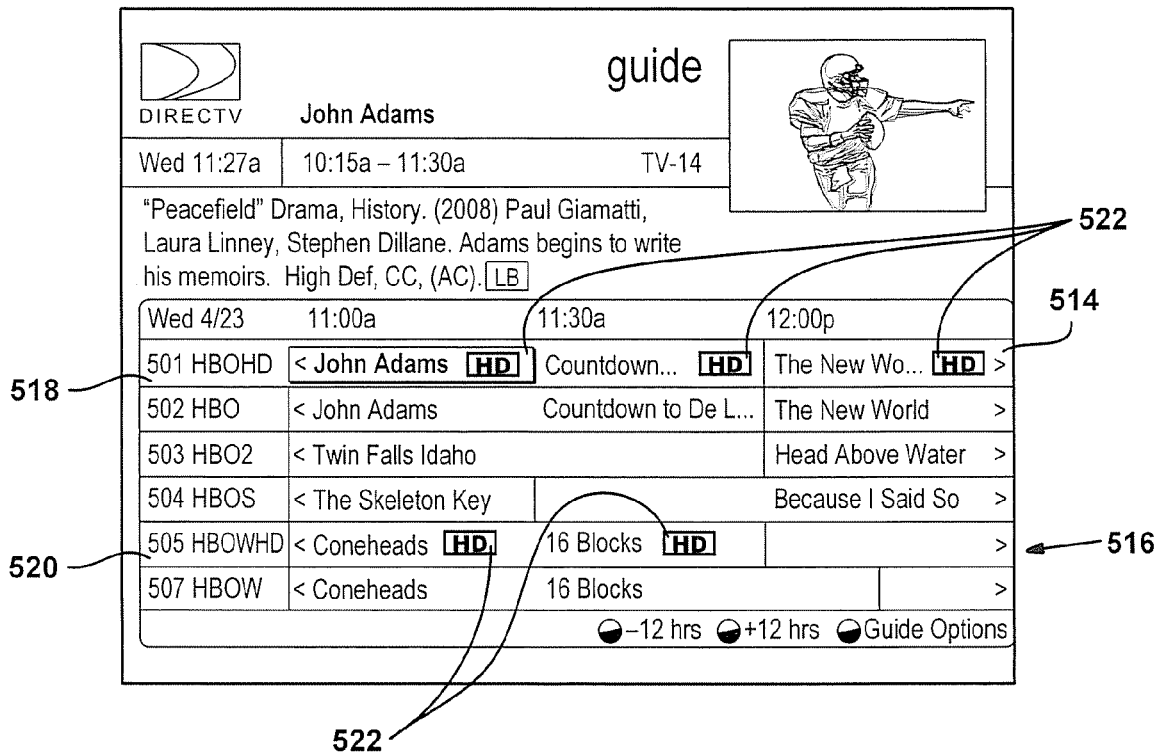

Referring now to FIG. 8B, should the resolution or service flag 220 of FIG. 3 be set to indicate high definition content has been enabled, the grid guide 512 of FIG. 8A is upgraded to grid guide 514 within the on-screen display 560. As is illustrated, the row 518 and the row 520 provide high definition content. Likewise, high definition icons 522 are illustrated next to the high definition content. As can be seen by contrasting FIGS. 8A and 8B, the high definition icons are not provided in FIG. 8A since only standard definition titles are illustrated. As well, the high definition rows corresponding to high definition channels are also not illustrated.

Figure 9A:
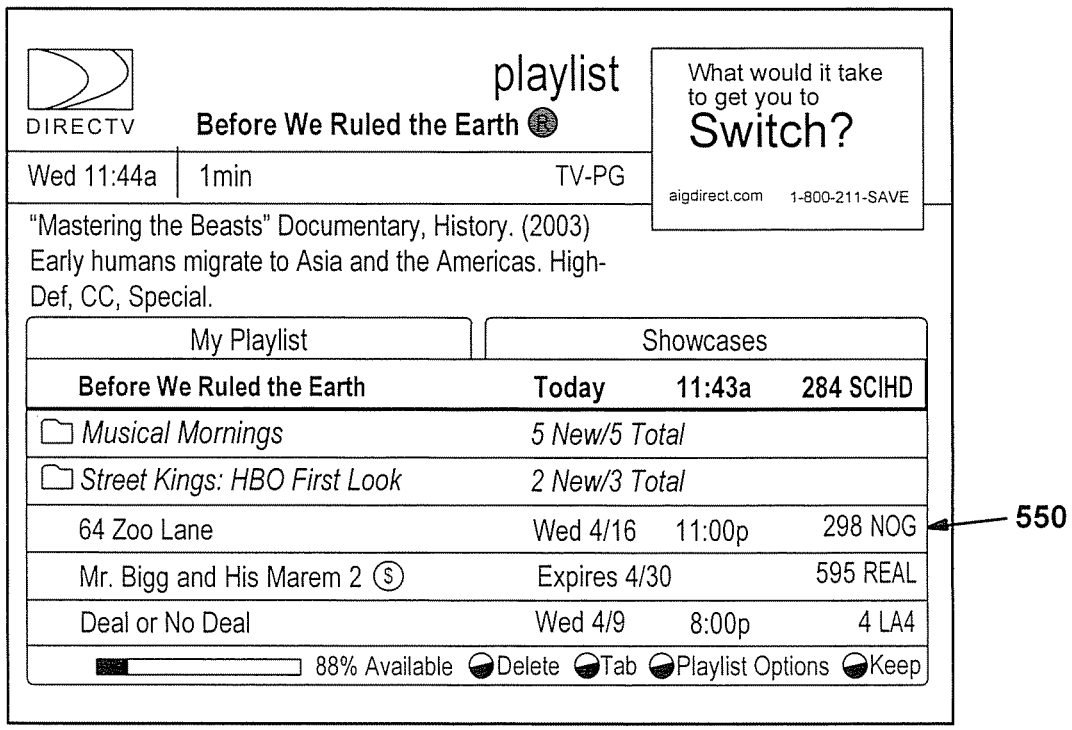
FIGS. 9A and 9B are on-screen displays illustrating the contrast between a playlist of content stored within a digital video recorder.

Referring now to FIG. 9A, an onscreen display 550 illustrating standard definition content stored within the digital video recorder is illustrated.

Figure 9B:
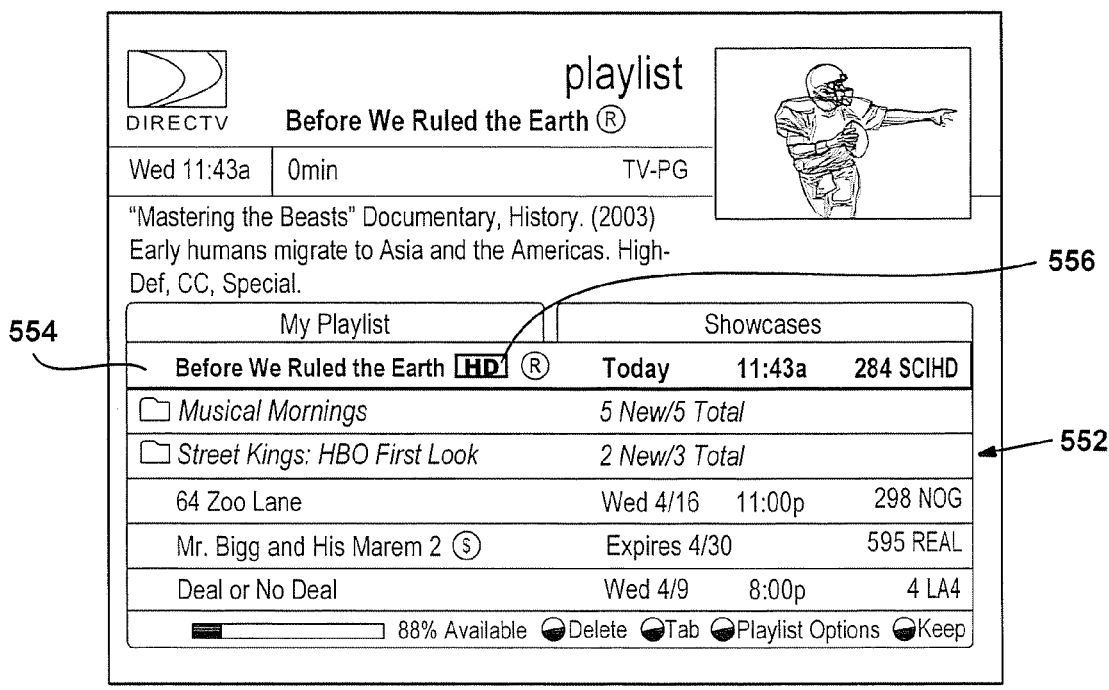

Referring now to FIG. 9B, after the service flag indicating high definition service is set, the content may be displayed in the on-screen display 552 to indicate the high definition content. For example, the row 554 corresponding to the title "Before We Ruled the Earth" has a high definition icon 556. As mentioned above, the digital video recorder may record all content that is in native high definition in high definition mode and play back high definition content in standard definition should the flag indicate standard definition is enabled. In the case of FIG. 9B, the high definition content is illustrated in the on-screen display 552 and thus may be provided in high definition to the user since the flag state indicating high definition has been enabled.

Figure 10:
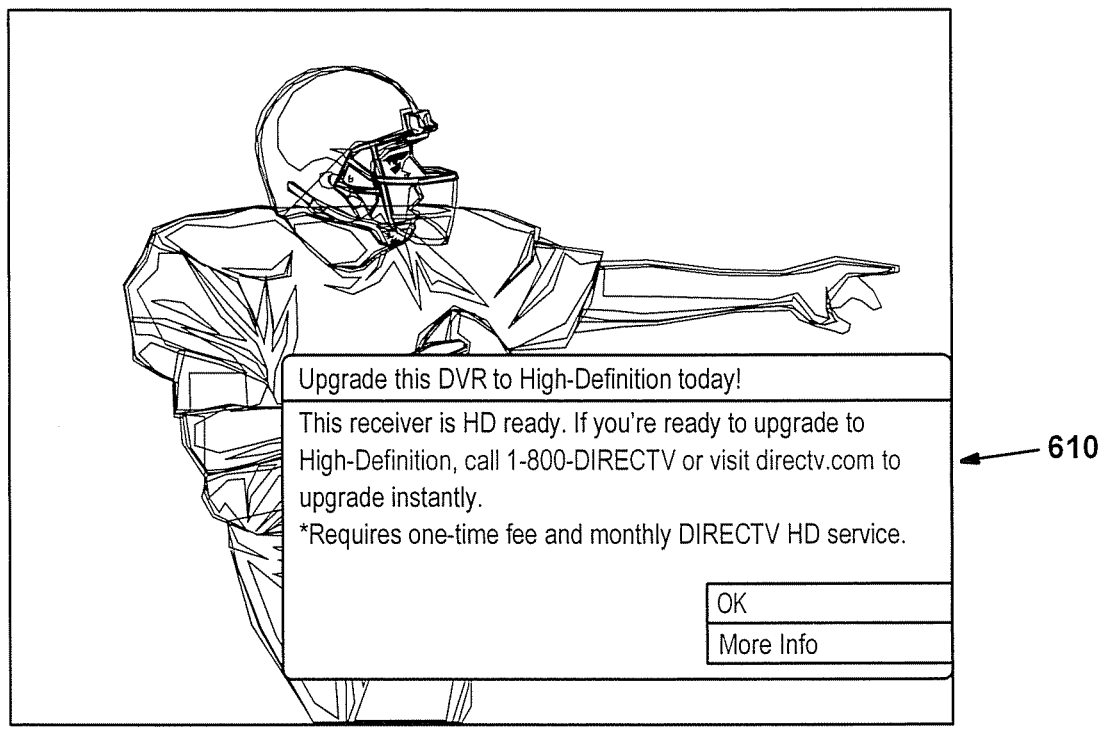
FIG. 10 is an on-screen display of an upgrade message.

Referring now to FIG. 10, an on-screen display 610 having an upgrade message is illustrated. The on-screen display 610 may be generated in step 416 of FIG. 7. The on-screen display 610 may be generated when the resolution button on the front of the receiver unit is pushed and the flag indicating standard definition is set. Instructions may be provided for upgrading the system to high definition through the on-screen display 610.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a receiving unit comprising:
   receiving a service signal at the receiving unit that originates from a billing system located externally from the receiving unit, said service signal comprising a receiver or user identifier;
   receiving an evaluate signal at the receiving unit from a headend, said evaluate signal comprising a content ID corresponding to a resolution upgrade or resolution downgrade;
   in response to receiving the evaluate signal, initiating, at the receiving unit, a determination of whether the service signal indicates a service change authorizing a first resolution or a second resolution different from the first resolution;
   when the service signal indicates the service change, changing a service flag within the receiving unit to indicate the first resolution or the second resolution; and
   changing an output of the receiving unit to the first resolution or the second resolution in response to changing the service flag.

2. The method as recited in claim 1 wherein receiving the service signal comprises communicating the service signal to a verifier module, and wherein the step of determining whether the service signal indicates a the service change comprises determining whether the service signal indicates the service change at the verifier module.

3. The method as recited in claim 1 wherein receiving the evaluate signal comprises receiving the evaluate signal at middleware.

4. The method as recited in claim 1 wherein changing the service flag comprises setting a flag in a non-volatile ram.

5. The method as recited in claim 1 further comprising when the service signal indicates the service change, changing a receiving unit output.

6. The method as recited in claim 1 wherein changing comprises changing the output from a first resolution signal to a second resolution signal different from the first resolution signal.

7. The method as recited in claim 1 wherein changing comprises changing the output from a second resolution signal to a first resolution signal.

8. The method as recited in claim 1 wherein changing comprises changing an on-screen display generated by the receiving unit program guide output from a first resolution menu to a second resolution menu.

9. The method as recited in claim 1 further comprising when the service signal indicates a service change, changing an on-screen display generated by the receiving unit program guide output from a second resolution menu to a first resolution menu.

10. The method as recited in claim 1 further comprising when the service flag corresponds to a first resolution service, hiding a second resolution channel rows in a grid guide and when the service flag corresponds to a second resolution service, showing the second resolution channel rows in the grid guide.

11. The method as recited in claim 1 further comprising when the service flag corresponds to a first resolution service, hiding a second resolution icons in a grid guide.

12. A method comprising:
receiving a service signal at the receiving unit that originates from a billing system located externally from the receiving unit, said service signal comprising a receiver or user identifier;
receiving an evaluate signal at the receiving unit from a headend, said evaluate signal comprising a content ID corresponding to a resolution upgrade or resolution downgrade;
changing a flag setting to indicate a first resolution or a second resolution different from the first resolution in response to both the evaluate signal and the service signal; wherein said service signal indicates a service change authorizing the first resolution or the second resolution;
receiving a second resolution signal at a receiving unit;
determining whether the flag setting is set within a memory of the receiving unit corresponding to a second resolution flag setting or a first resolution flag setting;
when the flag setting corresponds to the first resolution flag setting, reducing a resolution of the second resolution signal to a first resolution signal within the receiving unit; and
thereafter, generating the first resolution signal output from the receiving unit corresponding to the first resolution signal.

13. The method as recited in claim 12 further comprising storing the second resolution signal in a video recorder and wherein reducing comprises reducing the resolution after storing and before generating.

14. The method as recited in claim 12 further comprising storing second resolution icons within the receiving unit and further comprising hiding second resolution icons on an on-screen display associated with the receiving unit when the flag setting corresponds to the first resolution.

15. The method as recited in claim 12 further comprising storing second resolution channel entries in the receiving unit and wherein hiding second resolution channel entries in a grid guide when the flag setting corresponds to the first resolution.

16. A system comprising:
a receiver unit comprising,
a verifier receiving a service signal that originates from a billing system located externally from the receiving unit, said service signal comprising a receiver or user identifier; and
middleware receiving an evaluate signal generated externally from the receiving unit at a head end and said evaluate signal comprising a content ID corresponding to a resolution upgrade or resolution downgrade and said evaluate signal enabling the verifier to determine a service change authorizing a first resolution or a second resolution different from the first resolution from the service signal, said middleware changing a service flag to indicate the first resolution or the second resolution for the service when the service change is determined at the verifier;
changing an output of the receiving unit to the first resolution or second resolution in response to changing the service flag.

17. The system as recited in claim 16 wherein the receiver unit comprises a satellite receiver.

18. The system as recited in claim 16 further comprising a resolution button that generates an on-screen display message to activate a service in response to a service flag indicative of a standard definition state.

19. The system as recited in claim 16 wherein the service flag indicates a second resolution state or a first resolution state.

20. The system as recited in claim 16 further comprises a user interface module coupled to the middleware, said user interface module generating a program guide on a display by hiding second resolution channel when the service flag indicates a first resolution state.

21. The system as recited in claim 16 further comprises a user interface module coupled to the middleware, said user interface module generating a program guide on a display by hiding second resolution icons when the service flag indicates a first resolution state.

22. The system as recited in claim 16 further comprising a resolution module generating a first resolution signal from a second resolution signal in response to the service flag indicating a first resolution state.

23. The system as recited in claim 16 wherein the middleware changes a resolution signal when a change in service flag occurs.

* * * * *